(12) United States Patent
Kozai

(10) Patent No.: US 11,837,760 B2
(45) Date of Patent: Dec. 5, 2023

(54) FUEL CELL SYSTEM

(71) Applicants: KYOCERA CORPORATION, Kyoto (JP); DAINICHI CO., LTD., Niigata (JP)

(72) Inventor: Takeshi Kozai, Yokohama (JP)

(73) Assignees: KYOCERA Corporation, Kyoto (JP); DAINICHI CO., LTD., Niigata (JP)

( * ) Notice: Subject to any disclaimer, the term of this patent is extended or adjusted under 35 U.S.C. 154(b) by 131 days.

(21) Appl. No.: 17/434,062

(22) PCT Filed: Feb. 17, 2020

(86) PCT No.: PCT/JP2020/006108
§ 371 (c)(1),
(2) Date: Aug. 26, 2021

(87) PCT Pub. No.: WO2020/175218
PCT Pub. Date: Sep. 3, 2020

(65) Prior Publication Data
US 2022/0140364 A1 May 5, 2022

(30) Foreign Application Priority Data
Feb. 28, 2019 (JP) ................................ 2019-036898

(51) Int. Cl.
*H01M 8/0432* (2016.01)
*H01M 8/04746* (2016.01)
(Continued)

(52) U.S. Cl.
CPC ....... *H01M 8/0432* (2013.01); *H01M 8/0494* (2013.01); *H01M 8/04753* (2013.01); *H01M 8/04007* (2013.01)

(58) Field of Classification Search
CPC .......... H01M 8/0432; H01M 8/04753; H01M 8/0494; H01M 8/04007
See application file for complete search history.

(56) References Cited

U.S. PATENT DOCUMENTS

2009/0162712 A1* 6/2009 Yagi .................. H01M 8/04753
429/408
2012/0183876 A1 7/2012 Nakamura
(Continued)

FOREIGN PATENT DOCUMENTS

| JP | 2005268091 A | * | 9/2005 |
| JP | 2012003884 A | * | 1/2012 |

(Continued)

OTHER PUBLICATIONS

Machine Translation of JP-2012003884-A (Mar. 29, 2023) (Year: 2023).*

(Continued)

*Primary Examiner* — Matthew J Merkling
(74) *Attorney, Agent, or Firm* — VIERING, JENTSCHURA & PARTNER MBB

(57) ABSTRACT

A fuel cell system includes a fuel cell that generates electricity using a fuel gas and air, an air supply that supplies air to the fuel cell, a temperature meter that measures a temperature of the fuel cell, and a controller. The controller controls the air supply to increase an amount of air to be supplied to the fuel cell in response to the temperature of the fuel cell exceeding one of a plurality of predetermined temperatures.

14 Claims, 4 Drawing Sheets

(51) Int. Cl.
*H01M 8/04858* (2016.01)
*H01M 8/04007* (2016.01)

(56) References Cited

U.S. PATENT DOCUMENTS

| | | | | | |
|---|---|---|---|---|---|
| 2013/0183599 | A1* | 7/2013 | Otsuka | .............. | H01M 8/04052 |
| | | | | | 429/408 |
| 2013/0209903 | A1* | 8/2013 | Otsuka | .............. | H01M 8/04303 |
| | | | | | 429/416 |
| 2022/0140364 | A1* | 5/2022 | Kozai | .............. | H01M 8/04701 |
| | | | | | 429/428 |
| 2022/0320553 | A1* | 10/2022 | Tamura | .............. | H01M 8/04134 |

FOREIGN PATENT DOCUMENTS

| | | | |
|---|---|---|---|
| JP | 2013073901 | A | 4/2013 |
| WO | 2011037258 | A1 | 3/2011 |

OTHER PUBLICATIONS

Machine Translation of JP-2005268091-A (Mar. 29, 2023) (Year: 2023).*

* cited by examiner

FUEL CELL SYSTEM

CROSS-REFERENCE TO RELATED APPLICATIONS

This application is a national stage entry according to 35 U.S.C. § 371 of PCT Application No. PCT/JP2020/006108 filed on Feb. 17, 2020, which claims priority to Japanese Application No. 2019-036898 filed on Feb. 28, 2019, which are entirely incorporated herein by reference.

TECHNICAL FIELD

The present disclosure relates to a fuel cell system.

BACKGROUND

A fuel cell system is described in, for example, Patent Literature 1 (Patent Literature 1: WO 2011/037258).

SUMMARY

A fuel cell system according to one or more non-limiting aspects of the present disclosure may include a fuel cell that generates electricity using a fuel gas and air, an air supply that supplies air to the fuel cell, a temperature meter that measures a temperature of the fuel cell, and a controller that controls the air supply to increase an amount of air to be supplied to the fuel cell in response to the temperature of the fuel cell exceeding one of a plurality of predetermined temperatures.

BRIEF DESCRIPTION OF DRAWINGS

The objects, features, and advantages of the present disclosure will become more apparent from the following detailed description and the drawings.

DETAILED DESCRIPTION

A fuel cell system with the structure that forms the basis of a fuel cell system according to one or more non-limiting embodiments of the present disclosure will be described first.

A solid oxide fuel cell (SOFC) may generate electricity using a fuel gas as a hydrogen-containing gas and air as an oxygen-containing gas. Such a fuel cell may generate electricity using a fuel gas and air supplied in varying amounts to meet the power level requested by an external load, such as a home appliance.

Figure 1:
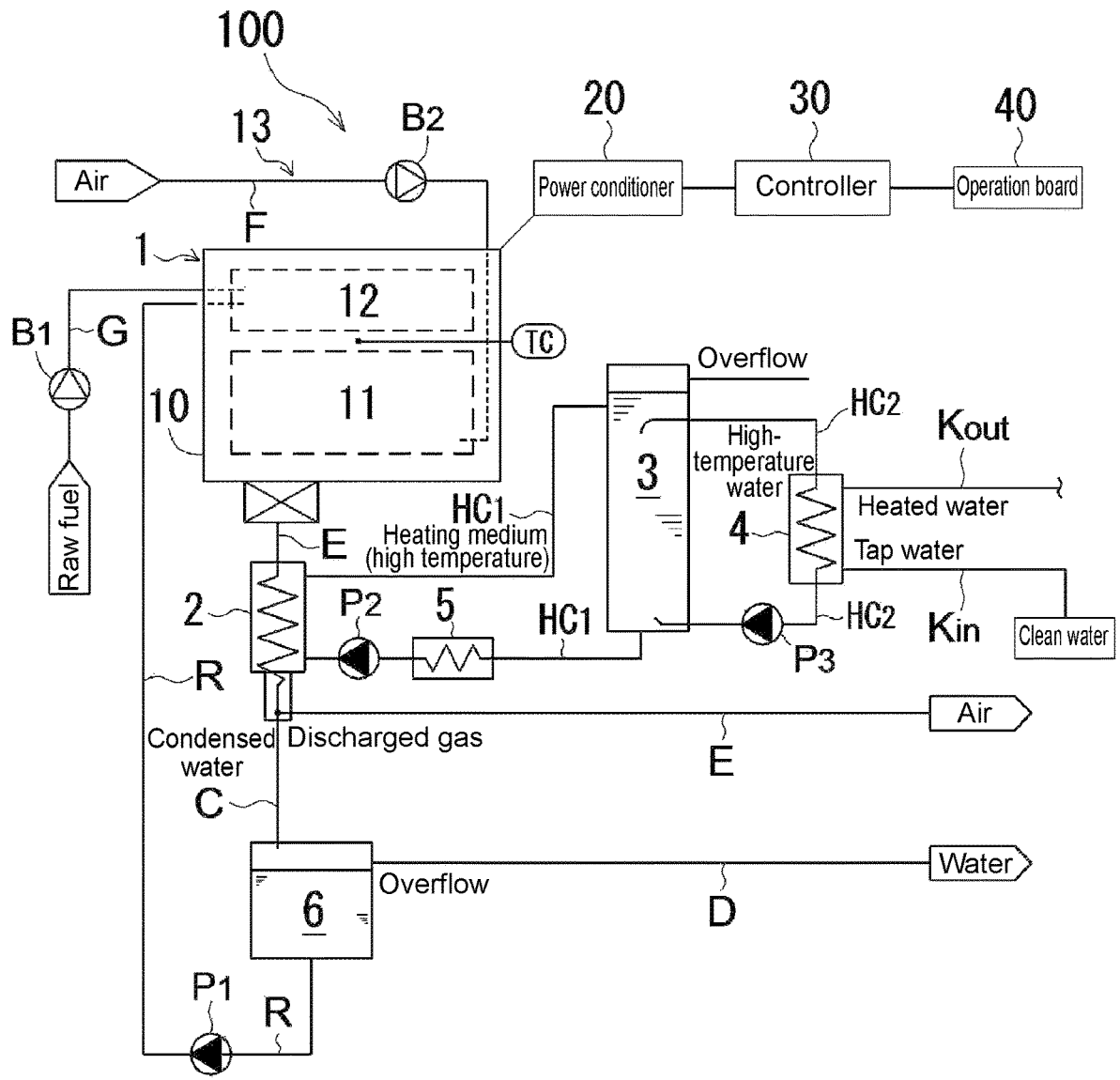
FIG. 1 is a schematic diagram of a fuel cell system according to one or more non-limiting embodiments of the present disclosure.
Figure 2:
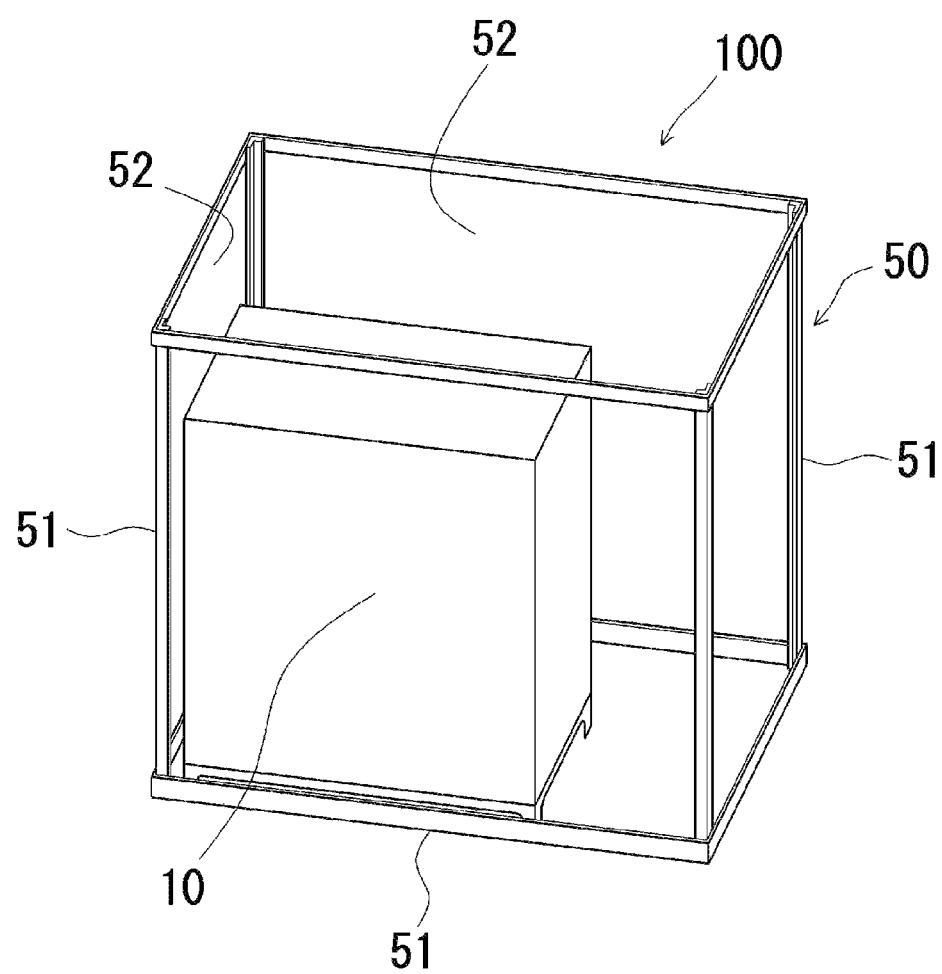
FIG. 2 is a perspective view of the fuel cell system housed in an external case.
Figure 3:
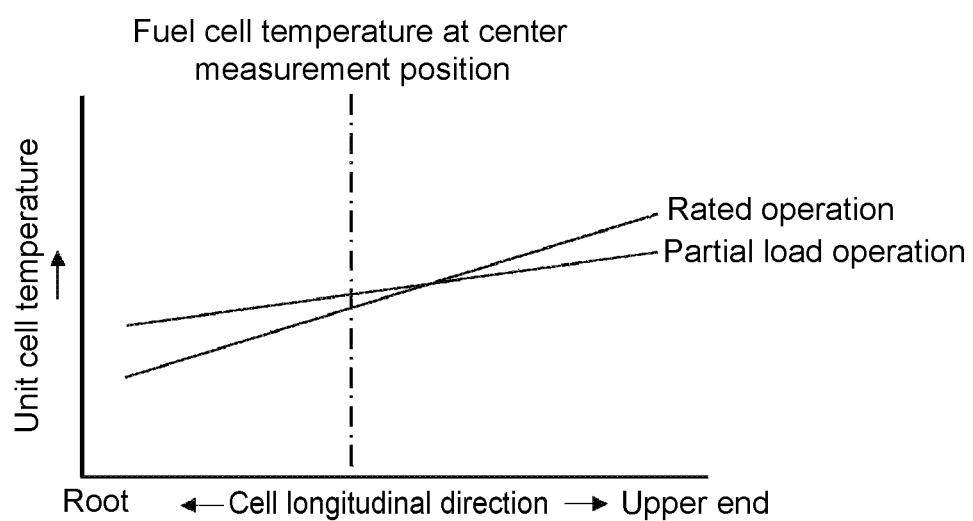
FIG. 3 is a graph showing the temperature of a fuel cell in a rated operation mode and in a partial load operation mode.
Figure 4:
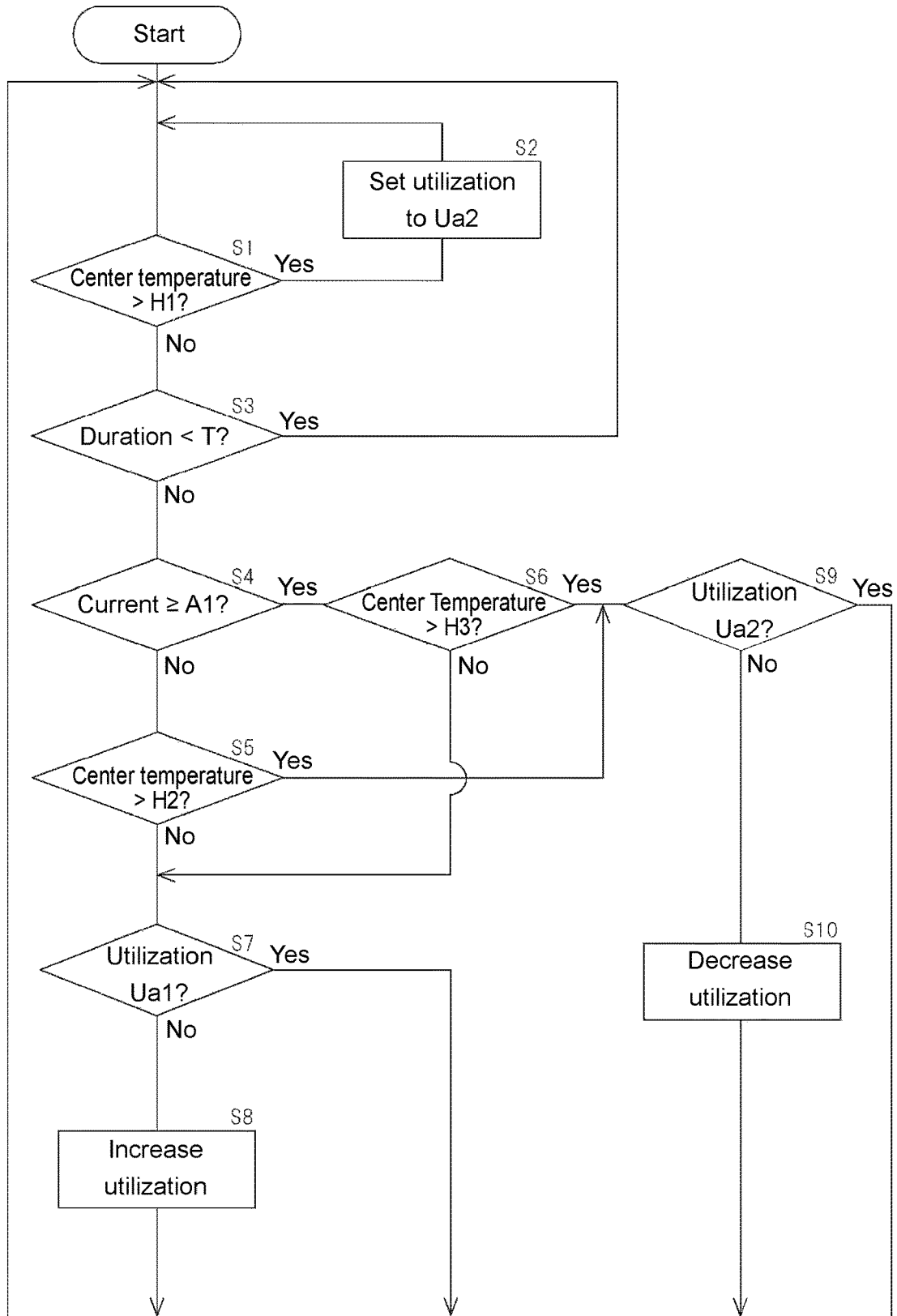
FIG. 4 is a flowchart showing control for increasing air.

A fuel cell system according to one or more non-limiting embodiments of the present disclosure will now be described with reference to the drawings. FIG. 1 is a schematic diagram of the fuel cell system according to one or more non-limiting embodiments of the present disclosure. FIG. 2 is a perspective view of the fuel cell system housed in an external case. FIG. 3 is a graph showing the temperature of a fuel cell in a rated operation mode and in a partial load operation mode. FIG. 4 is a flowchart showing control for increasing air.

A fuel cell system 100 according to one or more non-limiting embodiments includes a fuel cell 11 that generates electricity using a fuel gas and air, an air supply 13 that supplies air to the fuel cell 11, a temperature meter TC that measures the temperature of the fuel cell 11, and a controller 30. The fuel cell system 100 can operate in multiple operation modes in a manner switchable as appropriate. The operation modes used in the present non-limiting embodiment include at least a rated operation mode and a partial load operation mode (load-following operation mode). The rated operation mode is used for generating rated power. In the rated operation mode for generating rated power, the fuel cell 11 operates with a predetermined amount of fuel gas and a predetermined amount of air supplied to generate a predetermined level of power. The partial load operation mode is used for generating varying levels of output power in accordance with varying power levels requested by an external load. For example, the requested power level varies depending on the types and the number of home appliances to be used. In this operation mode, the fuel cell generates electricity in accordance with the varying requested power level.

As indicated by symbol HC1 in FIG. 1, the fuel cell system 100 includes a first heat circulation system (heat cycle) as a waste heat recovery system including a first heat exchanger 2, a heat storage tank 3, a refrigerator 5, a heating medium pump P2, and circulation channels connecting these components. As indicated by symbol HC2 in FIG. 1, the fuel cell system 100 also includes a second heat circulation system as a waste heat recovery system including a second heat exchanger 4 (also referred to as a clean water heat exchanger), a circulation pump P3 for circulation of a heating medium from the heat storage tank 3, and channel pipes connecting these components. The high-temperature heating medium stored in the heat storage tank 3 is used to heat, with the second heat exchanger 4, water such as tap water supplied from an external source through a supply channel Kin. The heated water is then supplied to a reheater, such as an external water heater, through a feed channel Kout.

A fuel cell module 1 includes the fuel cell 11 and a reformer 12 housed in a housing 10. The fuel cell 11 may have any cell structure that generates electricity using a fuel gas and air. For example, the fuel cell 11 may be a cell stack structure including multiple unit cells. The fuel cell 11 with the cell stack structure includes unit cells having their lower ends fixed to a manifold with an insulating bond such as a glass sealant between them. The fuel gas and air to be used by the fuel cell 11 for power generation are supplied through the lower ends of the unit cells. The fuel cell 11 includes the unit cells that are vertically arranged prisms having gas channels inside to allow gas to flow in the longitudinal direction. The unit cells are electrically connected in series to one another with a current collector between adjacent unit cells. Among various unit cells, SOFCs may be used in a fuel cell system with the partial load operation (load-following operation) mode as one of its operation modes.

The fuel cell system 100 may include a temperature meter TC to measure the temperature of the fuel cell 11. The temperature meter TC may be a measurement device such as a thermocouple. In the present non-limiting embodiment, the temperature at the center position of the fuel cell 11 is measured by a thermocouple and used as a representative value of the temperature of the fuel cell 11.

Gas discharged from the fuel cell module 1 through power generation performed by the fuel cell 11 exchanges heat using a heating medium or a refrigerant such as water flowing through the first heat exchanger 2. The moisture contained in the discharged gas then condenses to produce condensed water. The resultant condensed water is collected through a condensed water channel C and is stored in a reformed water tank 6. Any condensed water exceeding the capacity of the reformed water tank 6 overflows and is discharged through a water discharge channel D.

The discharged gas from which the moisture has been removed is discharged out of the fuel cell system through a discharged gas channel E. The reformed water stored in the reformed water tank 6 is supplied to the reformer 12 included in the fuel cell module 1 through a reformed water channel R and a reformed water pump P1, and is used for steam reforming of a raw fuel gas.

Air used for power generation in the fuel cell module 1 is supplied into the fuel cell 11 by the air supply 13. The air supply 13 includes a blower B2 and a pipe F as an air channel. The raw fuel gas, together with the reformed water flowing through the reformed water channel R, is supplied into the reformer 12 through a fuel gas pump B1 and a pipe G as a raw fuel gas channel.

The fuel cell system 100 may include various other components for, for example, power generation or hot water supply. The components described above are examples. The components other than those associated with the control for increasing air (described later) may have any structure.

The fuel cell system 100 may include, as auxiliary devices to assist its power generation operation, a power conditioner 20, the controller 30, an operation board 40 including a display and an operation panel, in addition to the fuel cell module 1 and other components described above. The fuel cell system 100 is housed in a case 50 including, for example, frames 51 and exterior panels 52 as shown in FIG. 2.

The fuel cell system 100 includes the controller 30 including at least one processor and a memory to implement control and processing capability for performing various functions described in detail later.

In various non-limiting embodiments, the at least one processor may be a single integrated circuit or may include multiple integrated circuits and/or discrete circuits that are connected to one another to allow communication between them. The at least one processor may be implemented with various known techniques.

In one non-limiting embodiment, the processor includes one or more circuits or units that perform one or more data computation procedures or processes by, for example, executing instructions stored in an associated memory. In some embodiments, the processor may be firmware, or for example, a discrete logic component that performs one or more data computation procedures or processes.

In various non-limiting embodiments, the processor may be one or more processors, controllers, microprocessors, microcontrollers, application-specific integrated circuits, digital signal processors, programmable logic devices, field programmable gate arrays, or any combination of these devices or configurations or any other known combination of devices and configurations that may perform the functions described later.

The controller 30 is connected to a memory and a display (both not shown) and to various components and various sensors included in the fuel cell system 100. The controller 30 controls and manages these functional components and thus controls and manages the entire fuel cell system 100.

The controller 30 obtains a program stored in its memory, and executes the program to implement various functions of the components of the fuel cell system 100.

To transmit control signals or various types of information from the controller 30 to other functional components or devices, the controller 30 may be connected to the other functional components either with wires or wirelessly. The particular control performed by the controller 30 in the present non-limiting embodiment will be described later. In the present non-limiting embodiment, the controller 30 controls various auxiliary devices, such as the fuel gas pump B1, based on instructions and commands from external devices connected to the fuel cell system or based on instructions and measurements results from various sensors listed above. In the figure, the connections between the controller 30 and the components of the fuel cell and the sensors may not be shown.

The memory (not shown) can store programs and data. The memory may be used as a work area to temporarily store the processing results. The memory includes a recording medium. The recording medium may include any non-transitory recording medium, such as a semiconductor memory or a magnetic memory. The memory may include multiple different recording media. The memory may include a combination of a memory reader and a portable recording medium, such as a memory card, an optical disc, or a magneto-optical disk. The memory may include a memory device usable as a temporary storage area, such as a random-access memory (RAM).

The controller 30 and the memory in the fuel cell system may be external to the fuel cell system 100, or may be implemented with a control method including particular control steps of the controller 30 in one or more non-limiting embodiments of the present disclosure, or as a control program for causing a computer to execute these steps.

The temperature of the fuel cell 11 in the rated operation mode and in the partial load operation mode will now be described briefly. FIG. 3 is a graph showing the temperature of the fuel cell in the rated operation mode and in the partial load operation mode. The fuel cell 11 in the present non-limiting embodiment is a cell stack structure including vertically arranged prism-like unit cells. The fuel cell 11 receives a fuel gas and air supplied through its lower end. In the rated operation mode, larger amounts of fuel gas and air are supplied than in the partial load operation mode, thus causing upper end portions of the vertically arranged unit cells to generate more power and thus have higher temperatures. In other words, the temperature profile shows an increase from the root portions to the upper end portions of the unit cells. In the partial load operation mode, smaller amounts of fuel gas and air are supplied, and the root portions of the vertically arranged unit cells are not cooled with air and thus have higher temperatures than in the rated operation mode. Further, the upper end portions of the unit cells generate less power than in the rated operation mode and thus have lower temperatures. In other words, the temperature profile shows a decrease from the root portions to the upper end portions of the unit cells. This temperature profile causes the temperature at the center position of the fuel cell 11 (center temperature) to be higher when the temperature is measured as a representative value of the fuel cell 11 in the partial load operation mode, although the output power level is actually lower in the partial load operation mode than in the rated operation mode. Thus, changing the amount of air supplied to cool the fuel cell 11 based on a higher center temperature assumingly indicating more power generation can cause either insufficient or excessive cooling or other issues.

When the temperature of the fuel cell 11 exceeds a predetermined temperature (threshold temperature) in the fuel cell system 100, the air supply 13 is controlled to increase the amount of air supplied to the fuel cell 11. However, the determination using the single threshold temperature can cause the issues described above due to the temperature distribution across the different operation modes. In the present non-limiting embodiment, multiple threshold temperatures are used for cooling the fuel cell 11 appropriately in different operation modes. This reduces the likelihood that the durability of the fuel cell system 100 decreases. In the present non-limiting embodiment, different operation modes are reflected in different levels of output power, which are then detected as the current values each representing the output power level.

FIG. 3 is a flowchart showing the control for increasing air. In this flowchart, symbol S represents a step, Yes represents a positive result (with a computer flag indicating 1) in the determination, and No represents a negative result (with a computer flag indicating 0) in the determination.

The control in the fuel cell system 100 includes, preceding the start of this process, measuring the center temperature of the fuel cell 22 continuously with the temperature meter TC. The measured center temperature may be used in control other than the control for increasing air. Once the air increasing control starts in the present non-limiting embodiment, the controller 30 starts monitoring the center temperature of the fuel cell 11.

The fuel cell system 100 controls the air supply 13 in accordance with an increase or decrease in the level of output power, and changes an air utilization Ua as appropriate. The air utilization Ua is the ratio of the amount of air used by the fuel cell 11 for power generation to the amount of air supplied to the fuel cell 11. The air utilization Ua includes a first utilization Ua1 as a reference value used during power generation.

In S1, the determination is performed as to whether the center temperature exceeds a first set temperature H1. The first set temperature H1 is the highest of set temperatures including a second set temperature H2 and a third set temperature H3, and is the upper limit of the operational temperature of the fuel cell 11. The second set temperature H2 is used for a level of output power of the fuel cell 11 less than a predetermined level corresponding to the partial load operation mode. The third set temperature H3 is used for a level of output power of the fuel cell 11 greater than or equal to a predetermined level corresponding to the rated operation mode, and lower than the second set temperature H2. In the present non-limiting embodiment, for example, the temperature H1 is 720° C., the temperature H2 is 690° C., and the temperature H3 is 660° C.

For the center temperature exceeding the first set temperature H1 (Yes), the temperature of the fuel cell 11 is to be lowered promptly. In S2, the controller 30 sets the air utilization Ua to a second utilization Ua2 lower than the first utilization Ua1, which is the reference value. This decreases the air utilization Ua, with the amount of air used for power generation remaining substantially unchanged although a larger amount of air is supplied to the fuel cell 11 to cool the fuel cell 11. In S2, the air supply 13 is controlled to increase the amount of air supplied to the fuel cell 11.

When the center temperature is lower than or equal to the first set temperature H1 (No), the determination is performed in S3 as to whether the duration for which the center temperature remains lower than or equal to the first set temperature H1 exceeds a predetermined time T. When the duration does not exceed the time T (Yes), the processing returns to S1. When the duration exceeds the time T (No), the controller 30 detects the output power level of the fuel cell 11 and determines whether the output power level is greater than or equal to a predetermined level. In detail, the current value output from the fuel cell 11 is measured as the output power level and is compared with a predetermined current value A1 to determine whether the current value is greater than or equal to the predetermined current value A1. In the present non-limiting embodiment, the time T may be, for example, two minutes.

When the current value is less than the current value A1 in S4 (No), the controller 30 determines whether the center temperature exceeds the second set temperature H2 in S5. When the center temperature exceeds the second set temperature H2 (Yes), the controller 30 determines whether the air utilization is the second utilization Ua2 in S9. When the air utilization is not the second utilization Ua2 (No), the air utilization is decreased by one stage in S10 to cause the air utilization to approach the second utilization Ua2. In other words, when the center temperature exceeds the second set temperature H2 in the partial load operation mode, the air supply amount is increased for cooling.

When the current value is greater than or equal to the current value A1 in S4 (Yes), the controller 30 determines whether the center temperature exceeds the third set temperature H3 in S6. When the center temperature exceeds the third set temperature H3 (Yes), the controller 30 determines whether the air utilization is the second utilization Ua2 in S9. When the air utilization is not the second utilization Ua2 (No), the air utilization is decreased by one stage in S10 to cause the air utilization to approach the second utilization Ua2. In other words, when the center temperature exceeds the third set temperature H3 lower than the second set temperature H2 in the rated operation mode, the air supply amount is increased for cooling.

When the air utilization is the second utilization Ua2 in S9 (Yes), the air utilization is unchanged and maintained. The processing then returns to S1. In other words, the air utilization is controlled to decrease in stages with the second utilization Ua2 as the lower limit.

When the center temperature is lower than or equal to the second set temperature H2 in S5 (No) or when the center temperature is lower than or equal to the third set temperature H3 in S6 (No), the controller 30 determines whether the air utilization is the first utilization Ua1, which is the reference value, in S7. When the air utilization is not the first utilization Ua1 (No), the air utilization is increased by one stage in S8. More specifically, when the center temperature is lower than or equal to the threshold temperature and the current air utilization is not the reference value in the partial load operation mode or in the rated operation mode, the controller 30 controls the air supply amount to cause the air utilization to approach and return to the reference value. In other words, the air utilization is controlled to increase in stages with the reference value or the first utilization Ua1 as the upper limit.

When the air utilization is the first utilization Ua1 in S7 (Yes), the air utilization is unchanged and maintained. The processing then returns to S1.

The present disclosure may be implemented in the following forms.

A fuel cell system according to one or more aspects of the present disclosure includes a fuel cell that generates electricity using a fuel gas and air, an air supply that supplies air to the fuel cell, a temperature meter that measures a temperature of the fuel cell, and a controller that controls the air supply to increase an amount of air to be supplied to the fuel cell in response to the temperature of the fuel cell exceeding one of a plurality of predetermined temperatures.

This reduces the likelihood that the durability of the fuel cell system decreases.

The present disclosure may be embodied in various non-limiting forms without departing from the spirit or the main features of the present disclosure. The non-limiting embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 11 fuel cell
13 air supply
30 controller
100 fuel cell system
TC temperature meter

What is claimed is:

1. A fuel cell system, comprising:
a fuel cell configured to generate electricity using a fuel gas and air;
an air supply configured to supply air to the fuel cell;
a temperature meter configured to measure a temperature of the fuel cell;
a power meter configured to measure an output power level of the fuel cell; and
a controller configured to control the air supply to adjust an amount of air to be supplied to the fuel cell, in response to the temperature of the fuel cell and in response to the temperature of the fuel cell in conjunction with the output power level of the fuel cell, based on a set of threshold temperatures comprising: a first set temperature, a second set temperature, and a third set temperature;
wherein
the first set temperature is a highest temperature of the set of temperatures,
the second set temperature is in conjunction with an output power level of the fuel cell that is less then a first output power level, and
the third set temperature is lower than the second set temperature and is in conjunction with an output power level of the fuel cell that is greater than or equal to the first output power level.

2. The fuel cell system according to claim 1, wherein the controller is configured to:
control the air supply to increase the amount of air to be supplied to the fuel cell in response to the temperature of the fuel cell exceeding the first set temperature, and
control the power meter to measure the output power level of the fuel cell in response to the temperature of the fuel cell not exceeding the first set temperature for a predetermined duration of time.

3. The fuel cell system according to claim 2, wherein the controller is configured to control air utilization of the fuel cell, the air utilization defined as a ratio of an amount of air used for power generation of the fuel cell to an amount of air supplied to the fuel cell, and the air utilization comprises a first utilization as a reference value, and
the controller is configured to decrease the air utilization in response to the output power level of the fuel cell being less than the first output power level and the temperature of the fuel cell exceeding the second set temperature.

4. The fuel cell system according to claim 2, wherein
the controller is configured to control air utilization of the fuel cell, the air utilization defined as a ratio of an amount of air used for power generation of the fuel cell to an amount of air supplied to the fuel cell, and the air utilization comprises a first utilization as a reference value, and
the controller is configured to decrease the air utilization in response to the output power level of the fuel cell being greater than or equal to the first output power level and the temperature of the fuel cell exceeding the third set temperature.

5. The fuel cell system according to claim 3, wherein
the air utilization further comprises a second utilization that is lower than the first utilization,
the controller is configured to control the air utilization in accordance with the second utilization in response to the temperature of the fuel cell exceeding the first set temperature, and
the controller is configured to decrease the air utilization in stages with the second utilization as a lower limit in response to the output power level of the fuel cell being less than the first output power level and the temperature of the fuel cell exceeding the second set temperature, or in response to the output power level of the fuel cell being greater than or equal to the first output power level and the temperature of the fuel cell exceeding the third set temperature.

6. The fuel cell system according to claim 5, wherein
the controller is configured to increase the air utilization in response to the output power level of the fuel cell being less than the first output power level and the temperature of the fuel cell being lower than or equal to the second set temperature; or in response to the output power level of the fuel cell being greater than or equal to the first output power level, the temperature of the fuel cell being lower than or equal to the third set temperature, and the air utilization differing from the first utilization.

7. The fuel cell system according to claim 4, wherein
the air utilization further comprises a second utilization that is lower than the first utilization,
the controller is configured to control the air utilization in accordance with the second utilization in response to the temperature of the fuel cell exceeding the first set temperature, and
the controller is configured to decrease the air utilization in stages with the second utilization as a lower limit in response to the output power level of the fuel cell being less than the first output power level and the temperature of the fuel cell exceeding the second set temperature; or in response to the output power level of the fuel cell being greater than or equal to the first output power level and the temperature of the fuel cell exceeding the third set temperature.

8. A non-transitory computer readable medium having instructions stored therein that when executed by a controller of a fuel cell system causes the controller to perform a method, the method comprising:
measuring a temperature of a fuel cell;
measuring an output power level of the fuel cell; and
adjusting an air supply to the fuel cell, in response to the temperature of the fuel cell and in response to the temperature of the fuel cell in conjunction with the output power level of the fuel cell, based on a set of threshold temperatures comprising: a first set temperature, a second set temperature, and a third set temperature, wherein the first set temperature is a highest temperature of the set of temperatures, the second set temperature is in conjunction with a power level output of the fuel cell that is less then a first power level, and the third set temperature that is lower than the second set temperature and is in conjunction with a power level output of the fuel cell that is greater than or equal to the first power level.

9. The non-transitory computer readable medium of claim 8, wherein the method further comprises:

increasing the amount of air supplied to the fuel cell in response to the temperature of the fuel cell exceeding the first set temperature, and measuring the output power level of the fuel cell in response to the temperature of the fuel cell not exceeding the first set temperature for a predetermined duration of time.

10. The non-transitory computer readable medium of claim 9, wherein the method further comprises:

controlling air utilization of the fuel cell, the air utilization defined as a ratio of an amount of air used for power generation of the fuel cell to an amount of air supplied to the fuel cell, and the air utilization comprises a first utilization as a reference value, and decreasing the air utilization in response to the output power level of the fuel cell being less than the first output power level and the temperature of the fuel cell exceeding the second set temperature.

11. The non-transitory computer readable medium of claim 9, wherein the method further comprises:

controlling air utilization of the fuel cell, the air utilization defined as a ratio of an amount of air used for power generation of the fuel cell to an amount of air supplied to the fuel cell, and the air utilization comprises a first utilization as a reference value, and decreasing the air utilization in response to the output power level of the fuel cell being greater than or equal to the first output power level and the temperature of the fuel cell exceeding the third set temperature.

12. The non-transitory computer readable medium of claim 10, wherein the method further comprises:

controlling the air utilization in accordance with a second utilization, the second utilization being lower than the first utilization, in response to the temperature of the fuel cell exceeding the first set temperature; and decreasing the air utilization in stages with the second utilization as a lower limit in response to the output power level of the fuel cell being less than the first output power level and the temperature of the fuel cell exceeding the second set temperature; or in response to the output power level of the fuel cell being greater than or equal to the first output power level and the temperature of the fuel cell exceeding the third set temperature.

13. The non-transitory computer readable medium of claim 12, wherein the method further comprises:

increasing the air utilization in response to the output power level of the fuel cell being less than the first output power level and the temperature of the fuel cell being lower than or equal to the second set temperature; or in response to the output power level of the fuel cell being greater than or equal to the first output power level, the temperature of the fuel cell being lower than or equal to the third set temperature, and the air utilization differing from the first utilization.

14. The non-transitory computer readable medium of claim 11, wherein the method further comprises:

controlling the air utilization in accordance with a second utilization, the second utilization being lower than the first utilization, in response to the temperature of the fuel cell exceeding the first set temperature; and decreasing the air utilization in stages with the second utilization as a lower limit in response to the output power level of the fuel cell being less than the first output power level and the temperature of the fuel cell exceeding the second set temperature; or in response to the output power level of the fuel cell being greater than or equal to the first output power level and the temperature of the fuel cell exceeding the third set temperature.

* * * * *